United States Patent
Melo

(10) Patent No.: US 9,531,987 B1
(45) Date of Patent: Dec. 27, 2016

(54) METHOD FOR AUTOMATICALLY REDUCING A VIDEO TO INCLUDE ONLY WHAT IS INTERESTING

(71) Applicant: GRAAVA, INC., Sunnyvale, CA (US)

(72) Inventor: Bruno Gregory Figueiredo Melo, Mountain View, CA (US)

(73) Assignee: Graava, Inc., Mountain View, CA (US)

( * ) Notice: Subject to any disclaimer, the term of this patent is extended or adjusted under 35 U.S.C. 154(b) by 0 days.

(21) Appl. No.: 14/817,153

(22) Filed: Aug. 3, 2015

Related U.S. Application Data

(60) Provisional application No. 62/032,480, filed on Aug. 1, 2014.

(51) Int. Cl.
| | | |
|---|---|---|
| *H04N 5/93* | (2006.01) | |
| *H04N 5/85* | (2006.01) | |
| *H04N 5/92* | (2006.01) | |
| *G11B 27/02* | (2006.01) | |

(52) U.S. Cl.
CPC .............. *H04N 5/85* (2013.01); *G11B 27/02* (2013.01); *H04N 5/92* (2013.01)

(58) Field of Classification Search
CPC .............. H04N 5/85; H04N 5/92; G11B 27/02
USPC ................ 386/278, 286, 281, 280, 326, 323
See application file for complete search history.

(56) References Cited

U.S. PATENT DOCUMENTS 5,493,273 A * 2/1996 Smurlo .................. G08B 29/16
340/309.16

\* cited by examiner

*Primary Examiner* — Robert Chevalier
(74) *Attorney, Agent, or Firm* — Mastermind IP Law P.C.; Diane L. Gardner

(57) ABSTRACT

A device capable of capturing a video stream and certain other data, such as acceleration, position, and sound is controlled to capture the data with a time stamp periodically during a video session. Upon completion of the video session, the video stream and time stamped data is processed by a computer-like program to determine the most interesting portions. The most interesting portions are later combined, whether within the video device or in another machine, to produce a subset video.

1 Claim, 10 Drawing Sheets

| Time | Altitude | Speed | PX | Sound | X-accel | Y-accel | Z-accel | Pulse | Command | Vote Total |
|------|----------|-------|----|----|---------|---------|---------|-------|---------|------------|
| 25:01 | 0 | 0 | 0 | 1 | 1 | 1 | 0 | 0 | 0 | 4 |
| 25:02 | 1 | 1 | 1 | 0 | 0 | 0 | 0 | 1 | 0 | 3 |
| 25:03 | 0 | 0 | 0 | 1 | 1 | 1 | 0 | 1 | 0 | 4 |
| 25:04 | 0 | 0 | 1 | 1 | 1 | 1 | 0 | 0 | 0 | 4 |
| 25:05 | 1 | 1 | 1 | 0 | 0 | 1 | 0 | 0 | 0 | 3 |
| 25:06 | 1 | 1 | 1 | 0 | 0 | 0 | 1 | 1 | 0 | 4 |
| 25:07 | 1 | 1 | 1 | 0 | 0 | 0 | 1 | 0 | 0 | 4 ⟩614 |
| 25:08 | 0 | 0 | 0 | 0 | 0 | 0 | 1 | 0 | 0 | 1 |
| 25:09 | 1 | 1 | 1 | 1 | 1 | 1 | 0 | 1 | 0 | 7 |
| 25:10 | 1 | 1 | 1 | 0 | 0 | 0 | 0 | 0 | 0 | 3 ⟩615 |
| 25:11 | 0 | 0 | 0 | 1 | 1 | 1 | 0 | 1 | 0 | 4 |
| 25:12 | 1 | 1 | 1 | 1 | 1 | 1 | 0 | 1 | 0 | 7 |
| 25:13 | 1 | 1 | 1 | 1 | 1 | 1 | 0 | 1 | 0 | 7 ⟩610 |
| 25:14 | 0 | 0 | 0 | 0 | 0 | 0 | 1 | 0 | 0 | 1 |
| 25:15 | 0 | 0 | 0 | 0 | 0 | 0 | 1 | 0 | 0 | 1 ⟩605 |
| 25:16 | 0 | 0 | 0 | 0 | 0 | 0 | 0 | 0 | 9 | 9 |
| 25:17 | 1 | 1 | 1 | 0 | 0 | 0 | 0 | 0 | 0 | 3 |
| 25:18 | 0 | 0 | 0 | 0 | 0 | 0 | 0 | 0 | 0 | 0 ⟩620 |
| 25:19 | 1 | 1 | 1 | 0 | 0 | 0 | 1 | 0 | 0 | 4 |
| 25:20 | 1 | 1 | 1 | 1 | 1 | 1 | 0 | 1 | 0 | 7 |

FIG. 6

METHOD FOR AUTOMATICALLY REDUCING A VIDEO TO INCLUDE ONLY WHAT IS INTERESTING

CROSS REFERENCE TO RELATED APPLICATIONS

This application is related to commonly-owned U.S. Provisional Patent Application Ser. No. 62/032,480 submitted 1 Aug. 2014 by Bruno Gregory Figueiredo Melo from which priority is hereby claimed, and which is hereby incorporated by reference in its entirety.

BACKGROUND

Personal video recording has experienced tremendous growth, primarily driven by the convenience of smart phones with video capability and small dedicated video cameras plus the popularity of posting one's videos at various social media sites.

Often times a video creator may record many minutes or even hours or days of video, but only want to post or save for future review a short version. The usual process is for the user to obtain software for use either in the recording device or on a personal computer that presents the entire video. The user then reviews the video looking for the most interesting moments to keep, discarding the rest. For a video covering a few hours the user may need to expand subsections of the entire video, looking for small time windows of interest. This may be time consuming, require expertise the user does not have, incur an expense if the task is out sourced, or the user may just put it off and the editing never gets done.

Such a process may be done by the user remembering which activity windows are remembered as being interesting, and/or searching to find them. This process would not include factors the subject of the video may not even be aware of, such as acceleration/deceleration, heart rate, change in elevation or other parameters. It may also be difficult for the editing person to select the needed time window of the most important segments to result in a final video of the desired time length.

What is needed is an automated method that examines the video of interest, taking into account other factors and sensor data, identifying time segments that are most interesting, then selecting and editing the segments to produce an edited video of the desired duration.

SUMMARY

The method disclosed herein identifies certain hardware and data resources that may be available within a video recording device and configures the device to record the data from the resources in addition to the video itself. Examples of resources to be used include an accelerometer, a microphone, a GPS receiver, video recorder, and a detector of a recording person's pulse, though other data may be used as well.

The various data values are recorded at predetermined time periods for later use. The data from the various data sources may be assigned weighting factors. Each data source/sensor may have a different characteristic that is considered important. A figure of merit for each time period is determined from the weighted value of each data source and a total determined. A user may select a running time for the final video. The method then selects various time segments, beginning with those that have the highest weighted value, selecting those with lower and lower weighted values until the desired running time is satisfied, then writes the result to an appropriate storage media.

Data that is captured is time stamped corresponding to a determinable time period in the video, for example elapsed time. Absolute time may also be used providing all devices have access to a common absolute time data source.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

FIG. 6 is an example of combining various analyzed sensor dataset into a total.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The disclosed method may be implemented in the form of software stored on a computer-readable non-transitory information storage medium such as an optical or magnetic disk, a non-volatile memory (e.g., Flash or ROM), RAM, and other forms of volatile memory. The information storage medium may be an internal part of the computer, a removable external element coupled to the computer, or unit that is remotely accessible via a wired or wireless network.

A video recording device may include a variety of sensor data that may be recorded. However all of the data may not be recorded by the device apart from instructions to do so. Also, the data may not include capturing time signals, which may be needed to be able to correlate disparate data events to a common point in time.

According to the present disclosure, a program, executable by a processor within the recording device, causes data to be captured by one or more of a variety of sensors, as shown in Table 1.

TABLE 1

| Sensor | Data captured | Significant Characteristic |
|---|---|---|
| Video camera {101} | Video | Sudden appearance of disappearance of an object |
| | | Change in overall light level |
| | | Appearance of a certain shaped object |
| | | Change in number of human faces in view |
| | | Appearance/disappearance of a specific person's face |
| Power Meter {110} | Cycling power meter | Instant power output of a rider or of a powered vehicle |
| Accelerometer {115} | Three-axis gyro | Rapid change of value |
| | Three axis acceleration | Rapid change of orientation |
| | | Above a predetermined threshold |
| | Tri-axial magnetic field | Zero value |
| | | Change of direction |
| | | Change of elevation or grade |
| Anemometer {120} | Wind speed and direction | Sudden increase or decrease in value |
| | | Sudden change in wind direction |
| Microphone {130, 135} | Digital sound | Rapid increase or decrease of sound level |
| | | Detection of a certain sound or word |
| Pulse/heart rate {140} | User's pulse rate | Sudden change in value |
| | | Above or below a selected absolute value |
| GPS {145} | Location | Vicinity to a certain location |
| | Direction of travel | Change of direction |
| | Altitude | Increasing or decreasing altitude |
| | Speed | Increasing or decreasing speed |
| | | Speed above or below a certain value (or zero) |
| | | Change of elevation or grade |
| Pressure Sensor {150} | Barometric pressure | Change of elevation |
| | | Change of grade |

Figure 1:
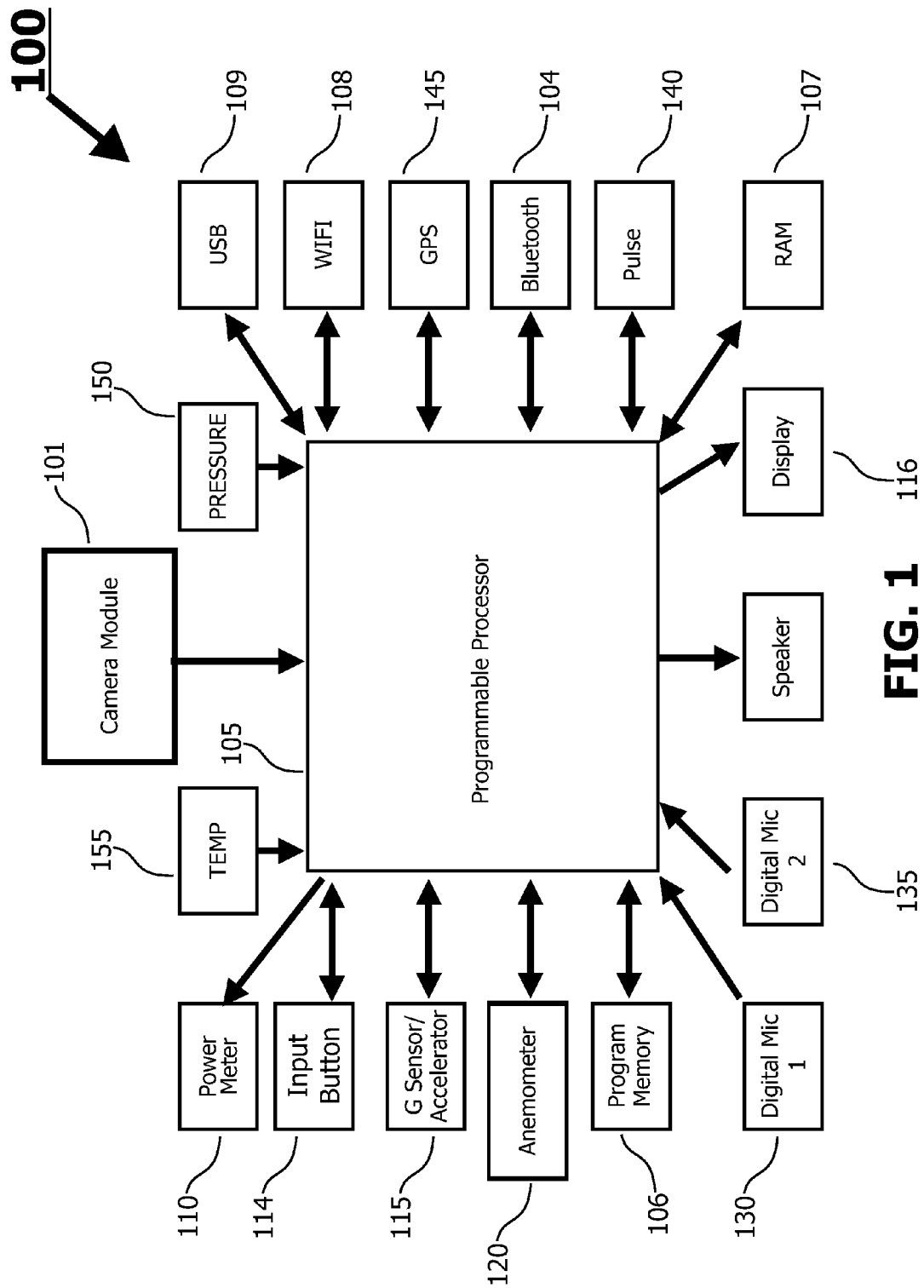
FIG. 1 is an exemplary complement of sensors electronically connected to a processor.

Referring to FIG. 1, with details indicated in Table 1 (reference numbers are in curly brackets), a system 100 includes a video camera module 101 electronically connected to a programmable processor 105, along with a suite of sensors and other peripherals typically comprising a cell phone, personal video camera, or a custom apparatus provided for the purpose of recording a video stream and other data, all time stamped to permit their correlation within a common time base. The system may be, for example, a cell phone which provides a time base, video recording capability, and some or all of the listed sensors plus ability to execute program steps stored in program memory 106. In another embodiment, a specialized camera system provides these capabilities. In some embodiments, the system may be partitioned. For example, a video camera may be electronically connected, wired or wirelessly, to an apparatus providing the rest of the sensor data and the programmable processor. A signal from the apparatus may command the video camera to begin recording, and perhaps provide a time signal for encoding on the recorded video stream. Alternatively a subset apparatus may monitor an incoming video stream, and begin capturing sensor data when a video stream begins. There are many other partitioning schemes available, which one of ordinary skill in the art would know of and select as a design choice, all of which comprise the system per the instant disclosure and are within the scope of this specification and the included claims regardless of partitioning.

Referring to Table 1, the instant method may make use of any one, more than one, or all of the data resources listed. The processor 105 execute the steps of a stored program 106, which may include drivers needed to access each sensor, including any setup, initialization, start or stop commands. When the value for a given sensor is determined for a certain time period, the value may be saved, including a time stamp of when the value was determined.

A system 100 comprises a video camera module 101, which may be built into a complete apparatus or an external camera, connected electronically to the processor 105. In some embodiments the camera and the rest of the sensor suite are not connected during video recording and data collection, but rather each saves time stamps, which may later be aligned to a common time base during post processing.

A power meter 110 may provide the power being expended during the video recording, with a time stamp at sampling times.

An accelerator 115 may provide acceleration information. In some embodiments the accelerometer 115 is a single axis sensor, in other embodiments a three-axis accelerometer 115 may be used. The additional acceleration data, for example transverse to the direction of travel, may be used to detect tilt of the vehicle, for example a two-wheeled vehicle making a sharp turn, or perhaps a fall.

An anemometer 120 may be used to detect wind speed and/or direction. A significant discrepancy between wind speed and ground speed may indicate a strong wind or change of wind speed.

A microphone 130 may provide noise information. Sudden spikes or silent periods may indicate an event of interest. In some systems 100 there are two microphones 130, 135. Two microphones may be used to provide removal of wind noise from other sound signals. Two microphones may also be used to detect a noise that is much stronger in one direction compared to the other. In some embodiment the sound track may be written to a sound track of the final video, even if sound data is not used in determining an event of interest.

A pulse sensor 140, sometimes denominated as a "heart rate monitor," provides the pulse rate of the wearer. Such data may indicate a time of high exertion or high stress or both. Typical heart rate monitors are battery powered, worn around one's waist, and provide the data via a Bluetooth channel, though other systems exist and may be used.

A GPS sensor 145 may provide a variety of data signals. Some GPS modules provide an accurate time of day signal. They may also be used for speed and direction of travel data. In some embodiments a GPS 145 module is used for altitude information. Calculating a change per unit of time may also provide slope information.

A pressure sensor 150 may provide barometric data. Barometric data may indicate a change in altitude or the sudden passage of a weather front.

Figure 2:
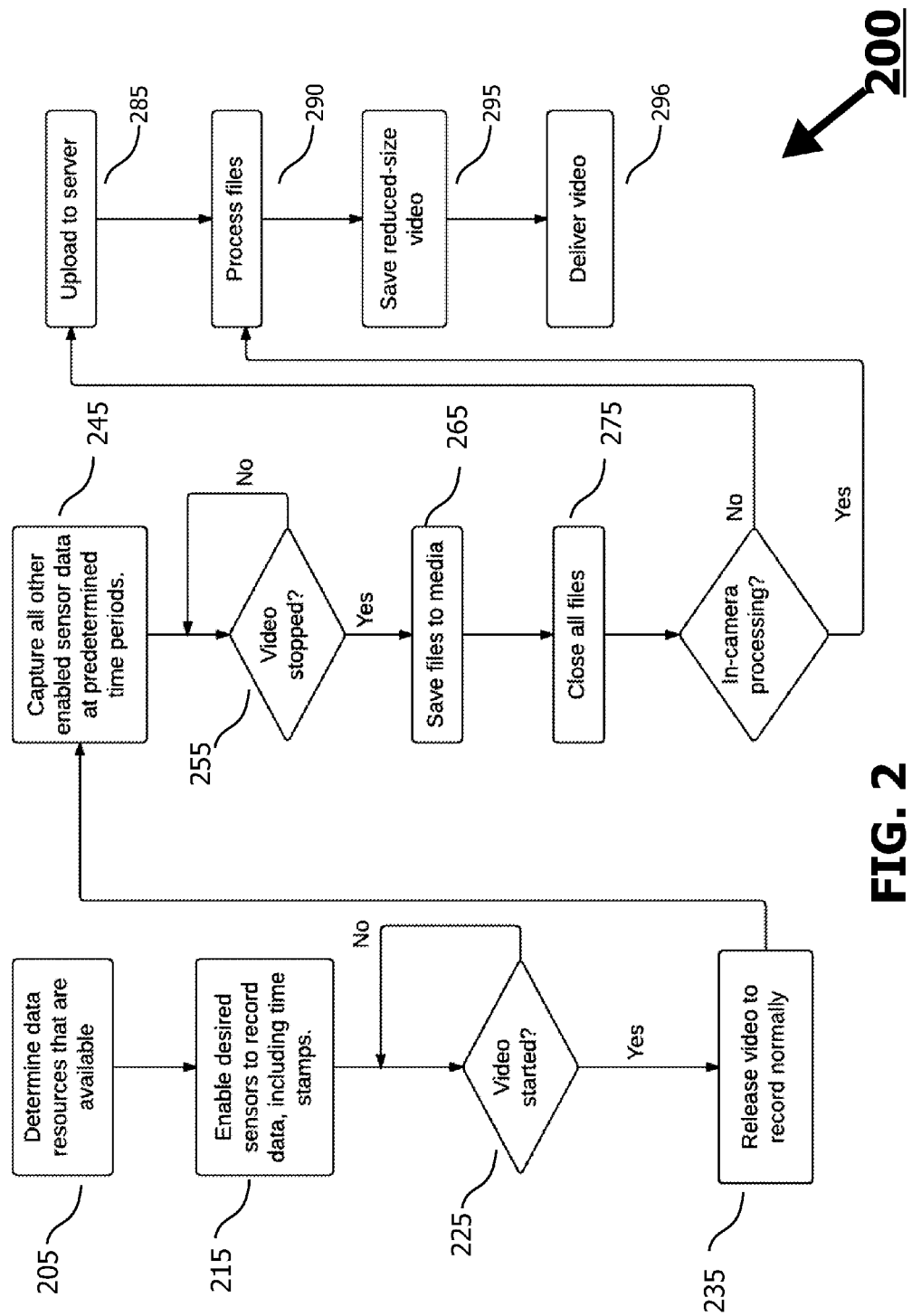
FIG. 2 is a flow chart for analyzing video and sensor data, then processing per certain requirements.

Looking to FIG. 2, a top level process 200 for video and data recording is disclosed, described in a flow chart. The steps described are steps in the stored program 106 unless otherwise described. At program start, the program determines what data resources are available 205. Some systems 100 may have fewer or more of the resources listed in Table 1 (FIG. 1). In some embodiments all resources are available, but only a subset are selected for use. The determination as to which available resources to use from all available resources may be determined by the user at the time of recording by way of a user menu (not shown) or may be filtered IN or OUT during post processing (described hereinafter) or by the user.

At step 215 the selected sensors are initialized, setup, and enabled though not recorded. Saving the selected sensor data may begin when video begins recording, or it may be recorded prior to step 215 and discarded.

Step 225 loops until video recording is started. In some embodiments the video stream is constantly available, but is not recorded until a user requests it, for example by pushing a button. In some systems 100 the microphones 130, 135 provide voice input and the program 105 includes voice to text recognition, which may further then process spoken commands, for example "Start recording." Voice to text conversion is a well known technology, particularly in cell phones, therefore is not further described here. Other triggers to start recording may be used, for example a preselected time of day, time out of a preselected time delay, a certain object of face is recognized in the video output, and the like.

When video recording has been released, at step 235 the video stream is recorded and immediately thereafter the sensor data is recorded at predetermined time periods 245. In some embodiments the video stream is continually recorded. In other embodiments the video stream is captured at predetermined time periods, for example once per second, twice per second, and so forth. In one embodiment the video is continually recorded but changes to a sample recording mode when the available video storage space only has a predetermine amount or percentage available. In some embodiments the video stream is continuously recorded, either full frame or sampled, then when video memory is full the oldest video (and associated data) is deleted such that the memory at each instant includes the current video plus the video for a fixed window of time into the past. One of ordinary skill in the art will know of other similar schemes, which are design choices.

When video recording is stopped 255 for any reason (for example by user command, out of memory, or a low battery condition) all files are saved to media 265 and files are closed 275. In some embodiments the files are continually saved to media in real time, in which case step 265 is not used.

After video and sensor data has been captured and saved electronically, they may then be analyzed independently (i.e., singly) towards the goal of determining the time periods of interest to be included in the final, shortened video. This process can be conceptualized as each sensor "voting" on whether or not a given time period is important; the more votes for a time period, the more important it is compared to other time periods with fewer votes. Hereinafter "YES" and "NO" will be used as stand-ins for TRUE and FALSE votes to include a certain time segment.

In some embodiments as few as one source of votes is used. For example, the video may be shortened by examining only the video stream, or only one sensor, for example speed, and using the votes from that sensor to determine which video segments should be selected for the final output. In some embodiments less than all are analyzed, in other embodiments all are analyzed but less than all are used for voting, and of course in another embodiment all data available may be both analyzed and used in voting. The disclosure herein will describe how each source of data may be analyzed.

Figure 3:
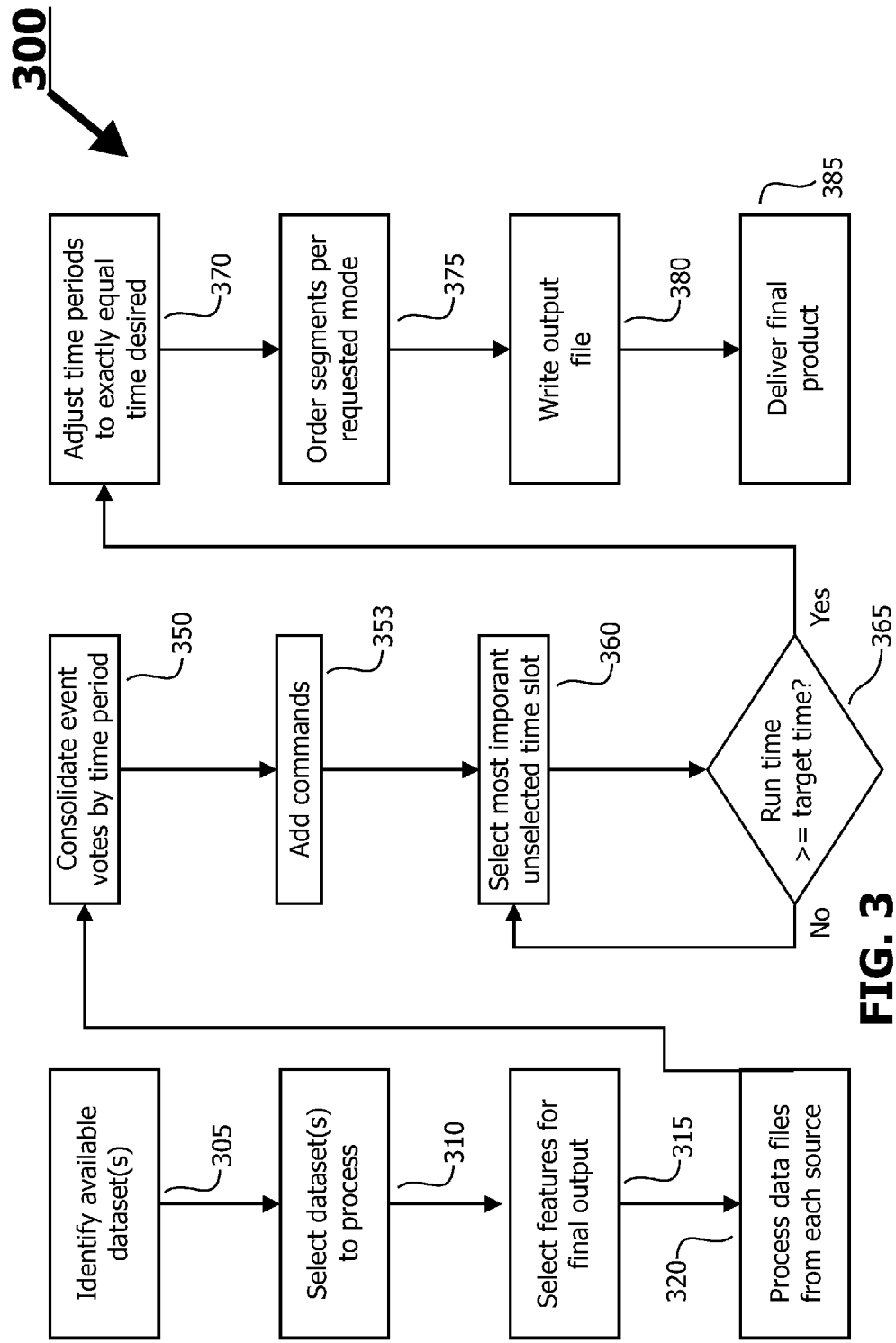
FIG. 3 is a flow chart for determining a shorter version of a video.

Looking to FIG. 3, a flow chart describes the process of analyzing the available data, then creating a final video output file per selected features and parameters. The process may be performed by the apparatus used to collect the data and video, which has previously been exemplified as a cell phone, portable video camera, or other electronic hardware providing the desired functions. In some embodiments the hardware only collects the data, then the data files are transferred to a user's computer or other storage medium, then processed by the user's computer. In another embodiment the data may be transferred to an internet-connected server often called a "cloud-based server", directly from the system 100 (which may or may not be through an intermediate storage step), permitting more powerful computing resources to be used to accomplish the post-collection processing.

We will refer to the system doing the post-collection process as simply "the analyzer." This may or may not be the same as the system 100 of FIG. 1. For the purpose of disclosure the process is described as being done by a cloud server which has a number of data sets stored at the cloud.

At step 305 the analyzer identifies the data sets available. A given data set consists of all video and sensor data collected during on ON/OFF cycle of the apparatus 100. In some embodiments a pause in recording is ignored, whereas in some embodiments a pause is deemed to be the end of one data set and the beginning of another.

At step 310 the data sets to be processed are selected. Some data sets may be associated with a given time period, for example one day or one vacation period, but older data sets which are unrelated to the instant processing activity may also be stored at the cloud server and be offered for selection or ignored by the user. In some embodiments a user makes a selection, in other embodiments the analyzer has been preprogrammed to recognize related data sets. In one embodiment a user may have prepositioned default decisions (settings) and criteria such that no interaction is needed apart from uploading a data set.

As with step 310, at step 315 a user may select desired features and other parameters. Selectable items include desired length of the final, shortened video output and which sensor data is to be included or ignored. The user may also provide a name or title for the output video, as well as an optional email address to which a link to the video may be sent. Links are often necessary because the video is likely to be too large for an email attachment. Other options include posting the video at various social networking sites, such as Facebook, Google+, and the like. In one embodiment an FTP function provides for moving the output video to a third location, such as Dropbox and other cloud storage resources.

In some embodiments a list of predetermined parameter sets are offered to the user from which one is selected. In some embodiments a default set of parameters is used whenever a new data set is uploaded.

At step 320 the data sets are analyzed. In some embodiments all files are opened and are examined for votes at a common time point until all are done for that time segment. In the instant disclosure we instead detail how a given sensor data set is analyzed completely before another sensor data set is analyzed.

The available sensor and video data is listed in Table 1, as reflected in FIG. 1. Each data set (in this sense "video" is simply another set of sensor data) may have the same or different analysis details. One embodiment comprises finding a rolling average of the sensor data values, then determining a positive and a negative offset value to be applied to the rolling average to determine an upper and lower boundary to the data. The instant data is then compared to the upper and lower boundaries and is considered a YES vote if the instant data is beyond either the upper or lower boundary. At any time point that the instant data value is within the upper and lower boundary values it is deemed to be a NO vote by that sensor, for that time period.

Figure 4:
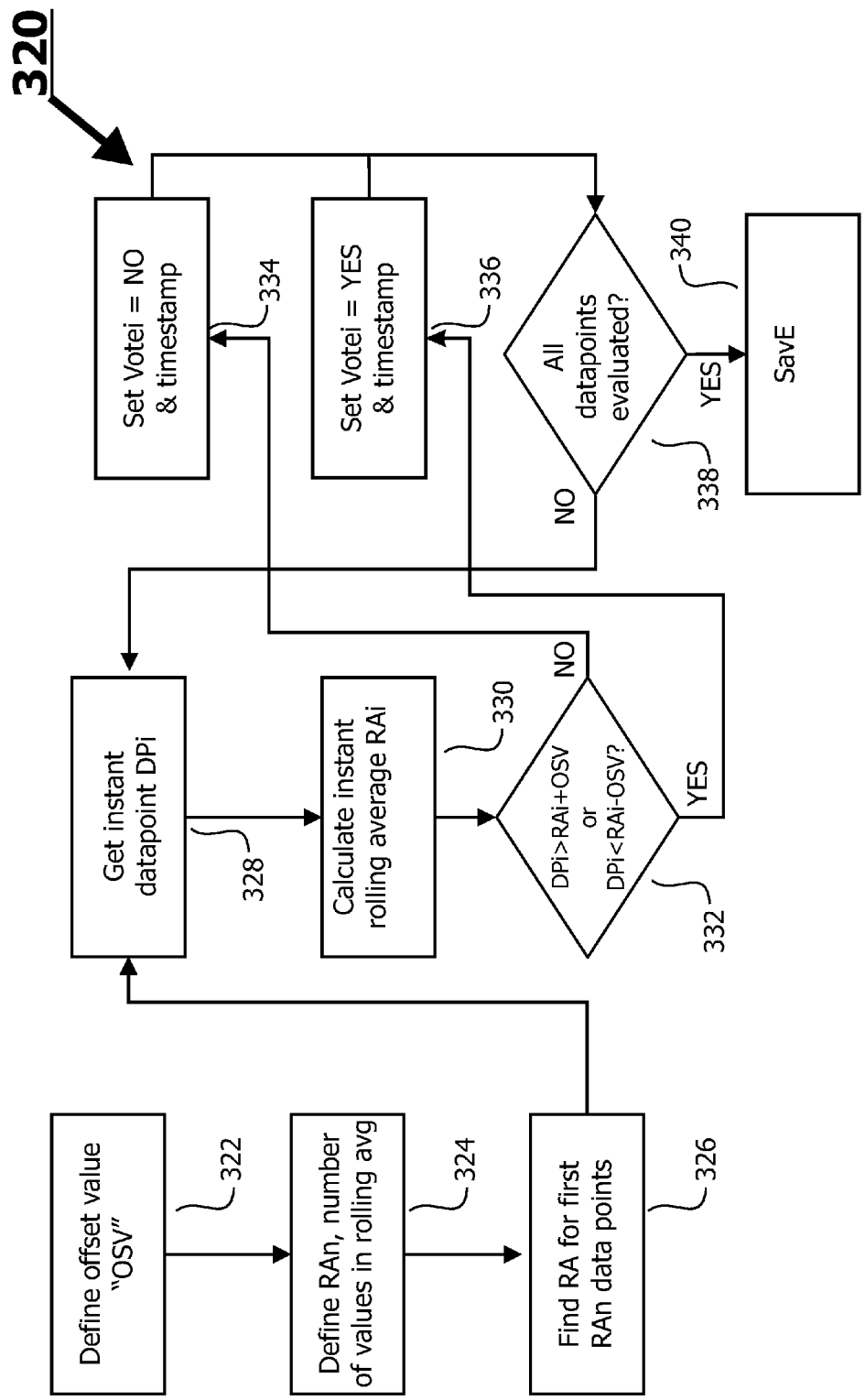
FIG. 4 is a flow chart for finding important moments in an individual set of video or sensor data.

Step 320 is further detailed in FIG. 4. At step 322 an offset value "OSV" is determined. The OSV is a constant that may be applied to an instant rolling average $RA_i$, both positively and negatively, to determine an upper and lower value or boundary for the current instant in time. For example, looking to FIG. 5 for an example of a portion of a data set related to heart rate or pulse, the value of the entire data set, that is, all of the pulse values during the recording time of the instant data set, was found to be 140.042. The OSV was selected to be 2% of the average, or OSV=2.8004 heart beats per second. These values are but examples; other OSV values may be more appropriate for this or other sensor data sets. The various examples are presented hereinafter.

Next, at step 324, a number of data points RAn is selected for calculating a rolling average. In this example the number of data points is arbitrarily selected to be ten; other values may be used as well. Once RAn is determined the process begins by finding the RA for the first RAn data points 326. This is a startup action; no votes are determined during this period.

Next a loop is initiated, starting with step 328, wherein an instant data point DPi is fetched 328 and used to calculate an updated RAi 330; that is, the average of the instant value DPi and the previous (RAn−1) points. OSV is then added to and subtracted from the RAi to determine an upper and a lower boundary for a test at step 332. The instant data point value DPi is compared 332 to (RAi+OSV) and (RAi−OSV). If DPi is within the boundaries 332, the program branches to step 334 where a NO vote is recorded along with the instant time stamp value. If DPi is outside of either the upper or lower boundary 332 then the program branches to step 336 where a YES vote is recorded along with the instant time stamp value.

Either boundary may be a numerically negative value, thus a YES vote would indicate that the absolute value of the difference between DPi and RAi is greater that the absolute value of the difference between the corresponding boundary and RAi. Steps 334 and 336 both proceed next to step 338, which is a test to determine if all data points DPi have been analyzed or not. If not, step 338 branches back to step 328 to repeat the process chain 328-to-338 until all data points DPi have been analyzed. When the step 338 determines that all data points have been analyzed, the program goes to step 340 to save the vote/time stamp pairs and exits.

Figure 5:
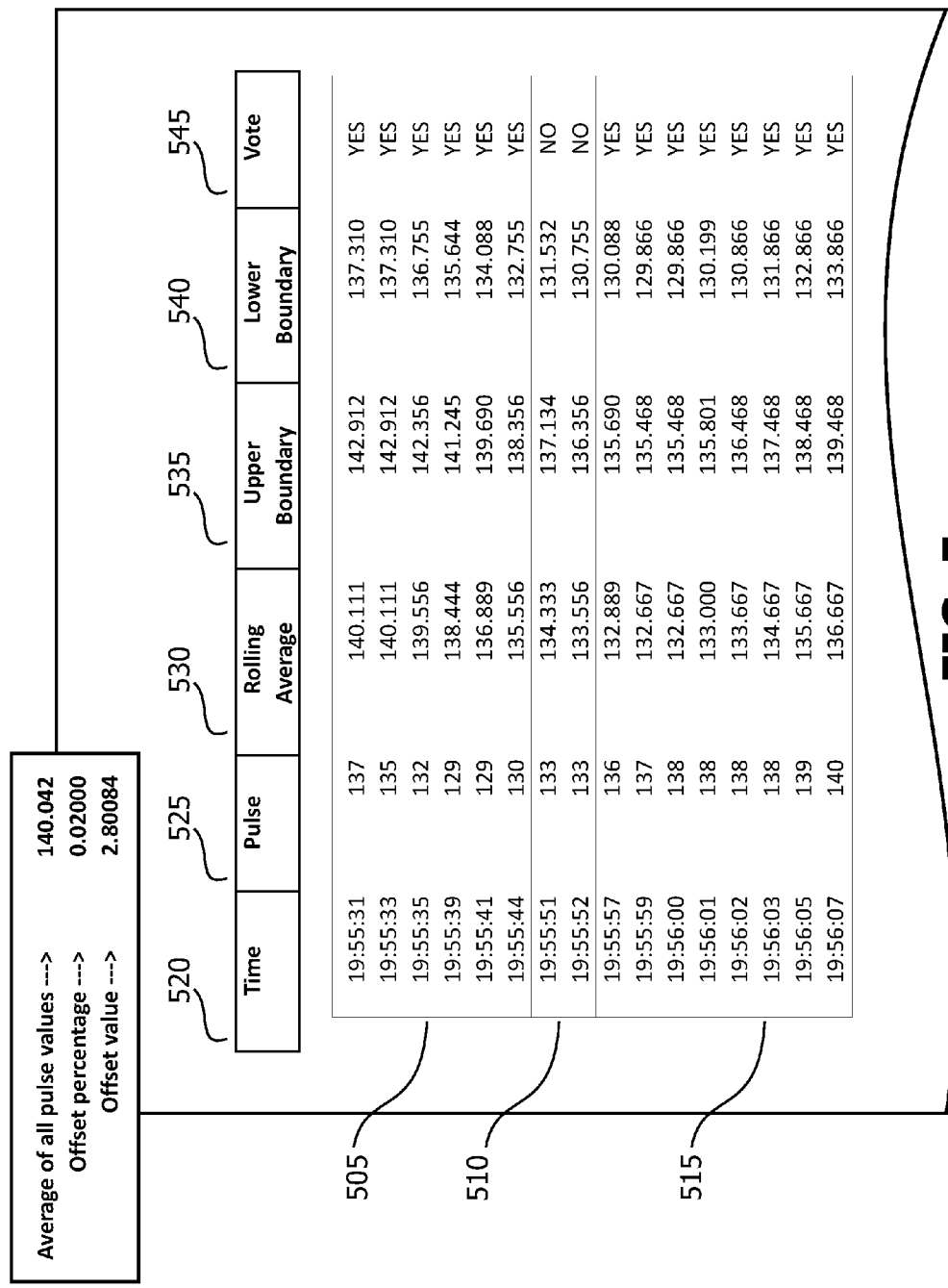
FIG. 5 is an example of analyzed data of a portion of a sensor data set.

Consider again the example shown in FIG. 5. Shown is a subset section of a recording of a rider's pulse 525 during a long bike ride. The value of pulse 525 was saved along with a time stamp 520 during the recording time. When the data set for pulse is analyzed by the analyzer, the first step is to calculate the average of all pulse values, which in this example is 140.042.

Next we see the rolling average RAi 530 as each DPi 525 is examined. Note that in the block of values denominated as 505 the DPi is always below the lower boundary 540, thus a YES vote 545 is determined. During the block of values indicated as 510, DPI 525 is always above the lower boundary 540 (RAi−OSV) and below than the upper boundary 534 (RAi+OSV), therefore a NO vote for each time period of that block 510 is recorded. Similarly, during time period denominated 515 the DPi 525 is again always above the upper boundary 535, therefore a YES vote would be recorded for each time period within that block.

Data may be captured at a predetermined or user selected time and frequency. For example, data may be captured on one second intervals, one minute intervals, or other intervals. In post processing, the data may be used according to Table 1 at each collected time interval or at a different time interval. For example, data may be captured every second, but evaluated at one minute intervals. The data may also be evaluated at a smaller interval, for example one second, and then averaged or totaled or some other value for a larger interval, for example one minute, or at other intervals. In some embodiments the data from one sensor may be evaluated at a different frequency or with a different evaluation method than any or some of the others.

The steps indicated in FIG. 4 (step 320 of FIG. 3) may be applied to the data from other sensors. Table 2 shows examples of the parameters used in one exemplary embodiment; for each sensor other values may be used to determine a YES or NO vote for a specific sensor in practicing the invention. In the examples of the instant disclosure the value of RAn is 10 seconds for each sensor type. In some embodiments some or all sensors have a different value of RAn than others. As shown and discussed relative to FIG. 4 (step 320) in each case an upper and lower boundary is determined as a offset to the instant RAi value and the instant data point DPi compared to the boundaries to determine a YES or NO vote. In some embodiments the offset value OSV is arbitrarily different for each sensor. Table 2 lists examples of the method for each sensor; other values may be found to be appropriate.

TABLE 2

Chart of OSV For Exemplary Sensors

| Sensor | Definition of OSV |
| --- | --- |
| Heart Rate/Pulse | (Average of all DPi) * .02 |
| Acceleration (X, Y, or Z) | 25% of maximum positive and negative of the three axes. |
| Speed (GPS) | 5 mph |
| Altitude (GPS) | 1 meter |
| Direction (GPS) | 5 degrees |
| Motion (video) | (Average of all counts of cells in motion) * .6 |

In some embodiments other means are used in determining the information described hereinabove for some data points. For example speed may be calculated at each time point by integrating acceleration data, as given by $$\text{Speed} = \int_{t0}^{t1} \frac{dv}{dt}$$

then the change in speed may be found by the simple mathematical difference in speed at various time points. Vector analysis of x,y,z-plane accelerations may similarly be used to determine elevation and/or grade, in that relative, not absolute, values are used. If the starting point is known (location) the same process may be used to determine a point of interest based upon instant location. A pressure sensor may alternatively be used to determine grade or change in altitude. One of ordinary skill in the art will know of many design decisions for alternative methods for finding the needed data.

Figure 8:
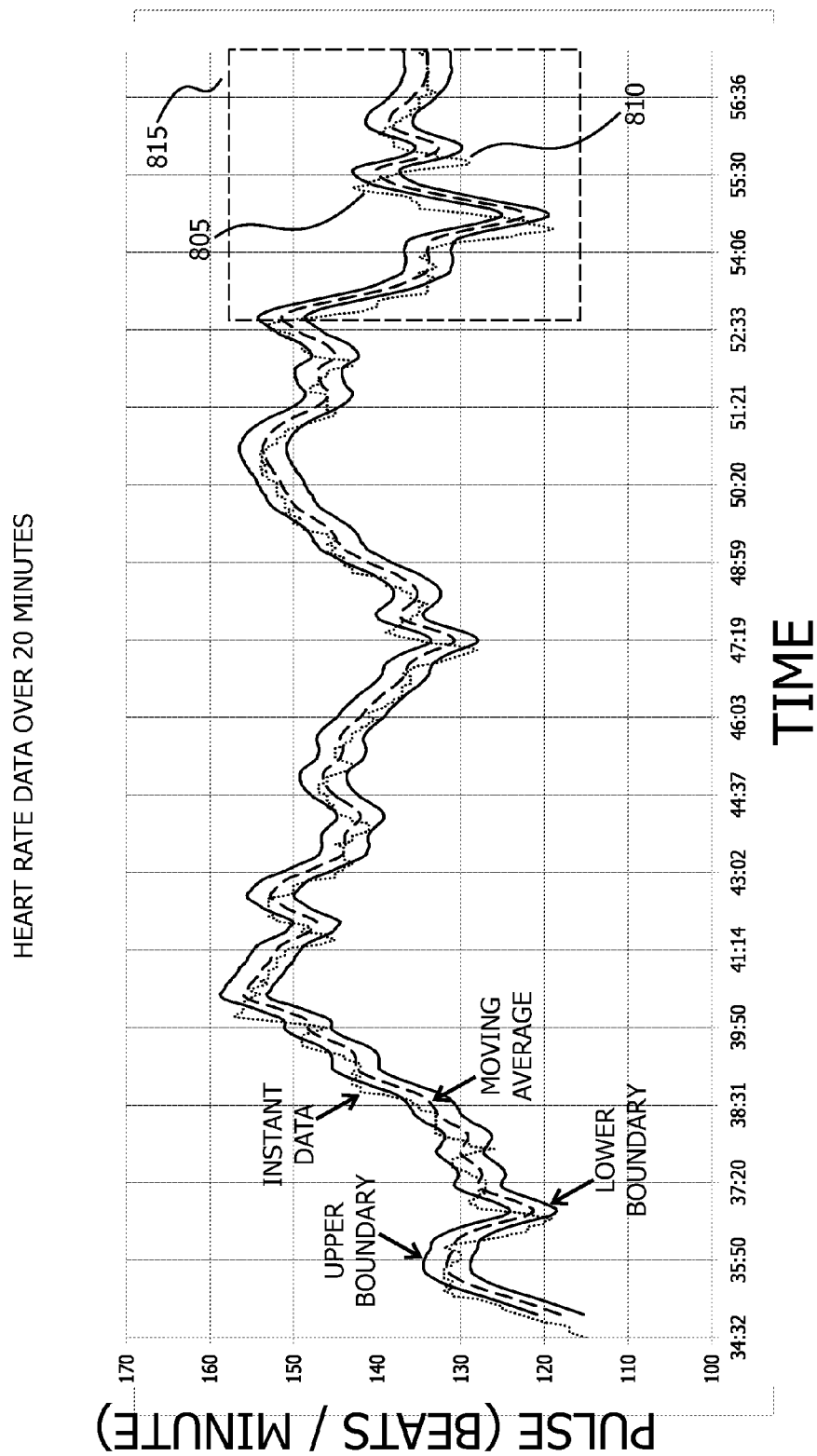
FIG. 8 is an example of sensor data plus a rolling average and boundaries.
Figure 9:
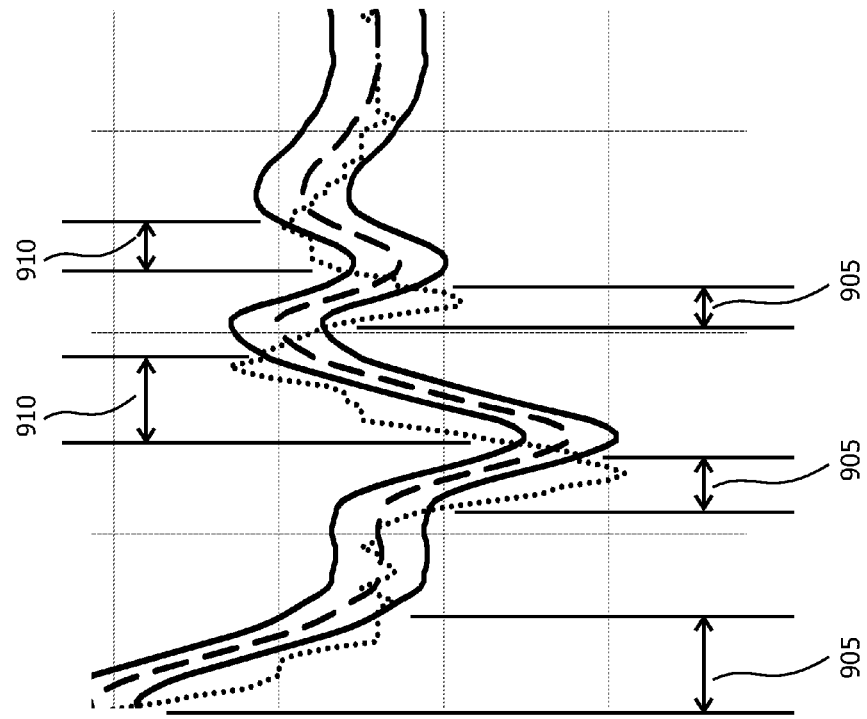
FIG. 9 is an expanded view of a section of FIG. 8.

Further description of the method of comparing DPi to boundaries may be seen in FIG. 8. In the close up area 815 one may see an example of a YES vote area 805 which is above the upper boundary and an example of another YES area 810 which is below the lower boundary. Looking at FIG. 9, the close up area 815 has three areas 905 that are YES zones due to being below the lower boundary and two YES zones 910 that are above an upper boundary. Each of these zones may be a series of sample times in duration.

Video data, when treated as just another sensor to be examined for time periods of interest, may require preprocessing before the comparison to boundaries method, described above, may be used. One such method is to first detect and quantify motion, conceptualized as a first layer. This step may be accomplished by using the OpenCV (Open Source Computer Vision) computer vision API. OpenCV is a library has more than 2500 optimized algorithms, which includes a comprehensive set of both classic and state-of-the-art computer vision and machine learning algorithms. These algorithms can be used to detect and recognize faces, identify objects, classify human actions in videos, track camera movements, track moving objects, extract 3D models of objects, produce 3D point clouds from stereo cameras, stitch images together to produce a high resolution image of an entire scene, find similar images from an image database, remove red eyes from images taken using flash, follow eye movements, recognize scenery and establish markers to overlay it with augmented reality. In the present implementation OpenCV is used on top of a Gstreamer open source framework. This process comprises the steps of:

Isolating the contours of objects in an image (using standard derivative methods on the basic video information), dividing the image frame into 16×16-pixel image cells, comparing adjacent video frames, then detecting in which image cells there was movement In some embodiments the prepressing activity stops here. It may, however, provide motion data that should not be considered interesting, for example repetitive motion (riding past lamp posts), insignificant motion (leaves rustling), or transient motion (a bug flying past the field of view). These issues may be dealt with by adding what is conceptually a second layer, implemented using MotionCells plugin for OpenCV. The process adds the step of:

Grouping the 16×16-pixel image cells into 256×256-pixel macro cells, and increasing the number of frames in the comparison window and using digital filters to detect and ignore transient and repetitive patterns The result is now a count of the macro cells (256×256) with changes, calculated each second, which now may be processed per FIG. 4.

Analysis of video data independent of other sensor data may itself lead to a shortened video stream of the most interesting points.

Returning again to FIG. 3, after each sensor of interest has been analyzed for its votes as to inclusion in the final video rendering, at step 350 the votes are added up for each time period. In some embodiments event-driven inputs may identify a time period of interest. For example, the video processing may detect a predetermined object or a face or a certain face is in view. Similarly, in some embodiments the user is enabled to force a certain time point to be included in the final video by saying a certain predetermined word, for example "Snapshot" or "Include" or some other design choice. Sometimes the system 100 includes a touch screen 116 which may mark a point for inclusion by a simple tap or a predefined "magic spot" on the display 116. Alternatively, the system 100 may include an input button 114 for the user to force a time period to be included. These may be time points that otherwise receive no YES votes from the other sensor but has some special meaning to the user. These event-driven inputs are denominated "commands" for inclusion.

FIG. 6 is an example of what the result may be once steps 350 and 355 are completed. The votes per-sensor are examined for each time period, then added up. For example, there are seven YES votes in the time periods 25:12 (615), 25:13 (610), 25:20 (620) and 25:09 (614). In some embodiments a command YES vote is inserted at a value greater than the maximum vote total from all sensors. In this example there are eight sensors, each with one vote, so Command having 9 votes guarantees that time period 25:16 (605) will be included in the final video.

In the example of FIG. 6 each sensor has exactly one vote, either YES or NO, shown as a one or a zero. In some embodiments the various sensors' vote is multiplied by a predetermined weighting factor, thus giving some sensors more influence on the final video outcome than other sensors. For example, Altitude votes could be multiplied by 0.5 and pulse votes multiplied by 2.0, then the totals found.

Figure 7:
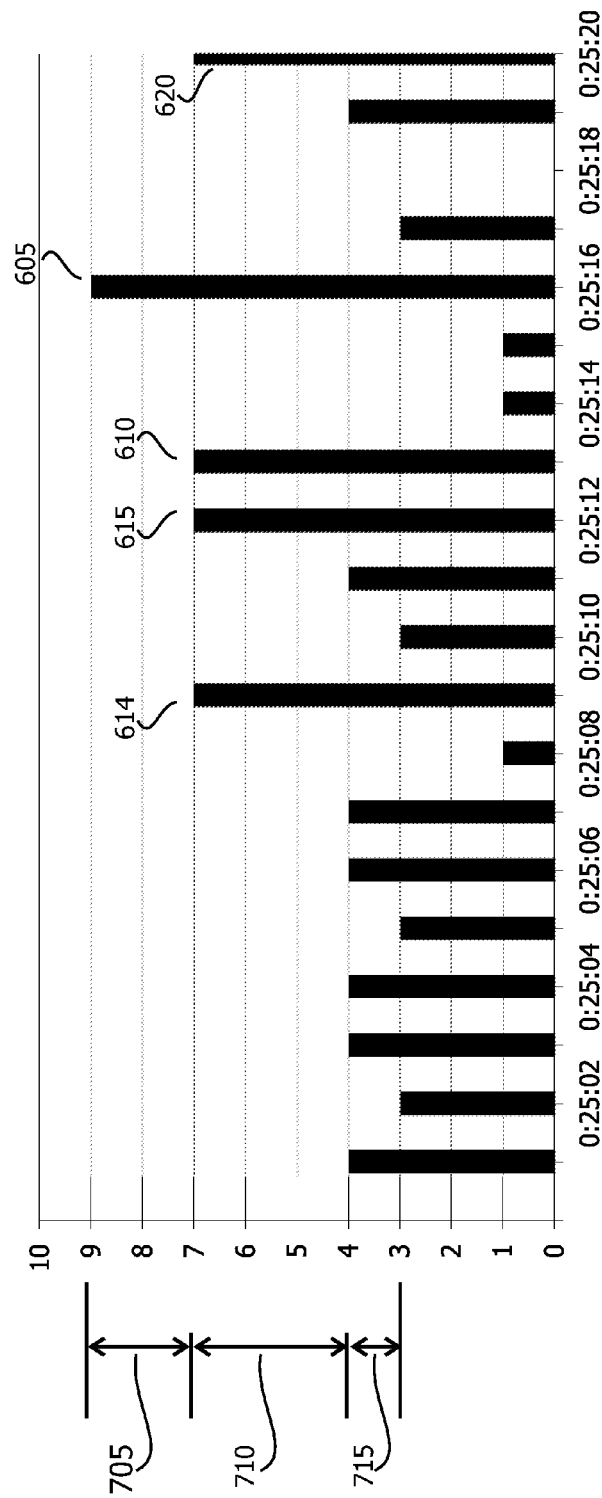
FIG. 7 is a graphical representation of the data from FIG. 6.

FIG. 7 is an example of how the vote table results may be further used in determining what time periods are included in the final video. The result corresponds to the steps of 350 and 355. Note time periods 605, 610, 615 and 620 from FIG. 6, shown again in a bar chart, wherein the more YES votes, the higher the bar, and the more important (i.e., interesting) its time period is deemed to be.

Referencing FIG. 3 again, we resume at step 360, wherein the most important time slot is selected for inclusion. Conceptually the analyzer starts at the highest possible vote level and looks for time periods at that level, then repetitively lowering the threshold for inclusion. So first all time periods within the range 705 are selected, that is, time period 25:16 (605). The threshold is then lowered to seven votes and time periods 614, 615, 610 and 620 are selected for inclusion. These are all the time slots within the vote range of 4 to 7 (710). When the threshold is lowered to 3-to-4 votes (715), seven more time periods are selected. Each time one or more time periods are selected for inclusion 360 their time periods are added to a running total time, which is tested at step 365 and the program advances to step 370 once the target time is reached. In some embodiments a segment which is not selected due to being below the threshold of importance for inclusion is selected anyway if it is a small duration between segments of much longer duration so that the final video is smoother.

With many DPi times in the one second range, a resulting video would be very jerky, perhaps unwatchable with such small time periods included. In one embodiment a leading and a trailing pad of five seconds is added to the time duration of selected time slots. Sometimes selected time slots are immediately before or after another selected time slot, and the pad is added to the leading and trailing time periods of the combination. A YES vote from some time periods has additional YES votes appended to the determined YES vote, anticipating that the video associated with that sensor, for example video, may be more important to the viewer than a different sensor, for example grade. In some embodiments a fade in and/or fade out period is inserted around a time period selected for inclusion, again adding to the time it adds to the total. In other embodiments titles may be inserted to indicate location, time of day, or other items of interest. All of these options may be comprehended in determining the run time of the final video resulting from the selected time periods. When the accumulated duration exceeds the target time 365, the program moves on to step 370.

In some embodiments the user may elect a minimum video duration plus an acceptable overrun. In other embodiments the user requests for the final video to be exactly a certain duration. If the selected time periods are in excess of the desired duration, step 370 makes adjustments to provide for a final duration as requested. A small amount of time may be trimmed off the leading and/or trailing pad of lower interest periods, or from the longer period(s) preferentially, or the same amount from all. One of ordinary skill will be aware of many such schemes which are design decisions and within the scope of the claims included hereinafter.

Step 375 now orders the selected segments according to one of several potential schemes. Sometimes the segments are presented in the order recorded. Sometimes the segments are presented in the order of importance. In some embodiments all segments including a selected object or face or location are consolidated into a continuous segment.

Once the order of segments is determined 375, the output video with synchronized sound is written to an output file 380. Optionally, the file may be delivered or otherwise provided to an end user 385. Examples include sending an email with a link to a final video, uploading to a user-selected social network service, such as YouTube.com or Facebook.com, or mailing a physical device, such as a DVD disk or a memory stick, for example.

For embodiments wherein the processing is performed by a user personal computer the files may be provided to the personal computer via a memory device include rotating media, such as hard drives or micro drives; flash memory, and written to an external device via USB, Firewire, SATA, Bluetooth, Wi-Fi, or other means.

In some embodiments the algorithm deletes time segments having a value below a value determined for resulting in a remaining time period corresponding to the target running time. In some embodiments the algorithm rank orders time periods, from the highest value to the lowest, then selects time segments from high towards low, then stops selecting segments when the target running time has been attained. In some embodiments the saved video is sequential in time. In some embodiments the sequence of display is not sequential, but presents the highest value segments first, then the next highest segments, and so forth. In some embodiments the saved video segments are grouped, for example all segments with a certain person's face visible, then a different person or different number of persons, or an object of interest in view. One of ordinary skill in the art will know other schemes of user interest to use to determine the order of presenting the various time segments.

Figure 10:
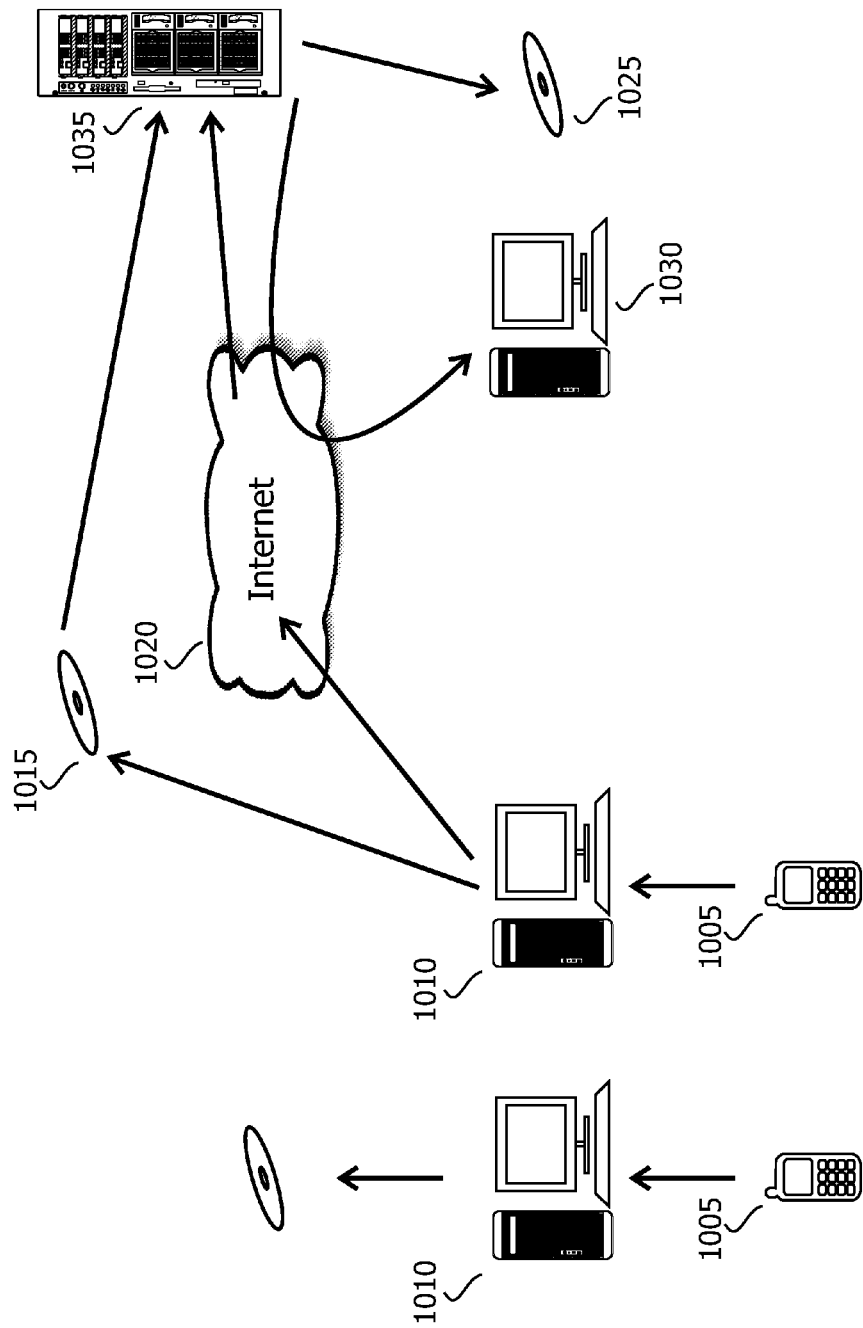
FIG. 10 is an example of the movement of electronic data to and from a service computer for further processing.

Reduction of the source video to a shorter version, with or without other sensor data, is sometimes performed by the system 100. However the processing required may exceed that available to a cell phone or digital camera. Referring to FIG. 10, consider the recording being done by a digital video recording device 1005, for example a cell phone or digital camera. The recorded data (video plus sensor) may be provided to a personal computer 1010 by a variety of means, for example a Bluetooth link, wifi over the LAN, USB, or a portable memory device. The personal computer may then perform the analysis steps, writing the reduced video and sound to a compact disc or DVD 1015.

In another embodiment the digital recording device 1005 provides the video and sensor data to a personal computer 1010 which in turn writes the data to a DVD 1015 which may then be sent to a service for processing on the server computer 1035 via the internet 1020 or by writing the data to a DVD 1015, which in turn is sent via U.S. mail, Federal Express, or similar services. Alternatively, the personal computer 1010 may upload the video and sensor data to the service computer 1035 through the internet cloud 1020, either directly or through an intermediate storage such as Dropbox and other cloud based services. The service computer 1035 may then perform the video reduction as requested by a user, returning the output as a link to a personal computer 1030, which may be the source personal computer 1010 or a different personal computer 1030 as requested by the user. The personal computer 1030 may also be the server of a social network service such as Facebook. The service computer 1035 may also write to a physical media, for example a DVD 1025, which is sent per order instructions via U.S. mail, Federal Express or similar means.

Note that the video, with or without sound, may already exist, perhaps stored previously in a personal computer 1010 or converted from another means, for example a VHS recording. That is, video that is not recorded with the digital recording device 1005, thus is absent the other sensor data. The video then may be provided to the service computer 1035 by the same means as the others shown in FIG. 10.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for recording video and sensor data, then automatically reducing the video to a shortened version, comprising:

recording a video data stream with concurrent sound and data sets from a plurality of sensors, analyzing one or more of the sensor data sets to identify the instants of time that may be interesting to a human, assigning a weighting factor to each of the potential data set points, combining the weighted data set points by calculating their weighted total for each instant of time, and selecting instants of time to include in a final video according to their weighted total, preferring the instants of time with the higher total until the total time of the segments selected is equal to a predetermined duration, and saving the shortened version of the video to a memory device.

* * * * *